(12) United States Patent  
Sujan et al.

(10) Patent No.: US 8,886,422 B2  
(45) Date of Patent: Nov. 11, 2014

(54) SYSTEM AND METHOD OF CYLINDER DEACTIVATION FOR OPTIMAL ENGINE TORQUE-SPEED MAP OPERATION

(75) Inventors: Vivek A. Sujan, Columbus, IN (US); Timothy R. Frazier, Columbus, IN (US); Kenneth Follen, Greenwood, IN (US); Suk-Min Moon, Greenwood, IN (US)

(73) Assignees: Cummins Iintellectual Property, Inc., Minneapolis, MN (US); Paccar, Inc., Bellevue, WA (US); Eaton Corporation, Cleveland, OH (US)

( * ) Notice: Subject to any disclaimer, the term of this patent is extended or adjusted under 35 U.S.C. 154(b) by 96 days.

(21) Appl. No.: 13/407,715

(22) Filed: Feb. 28, 2012

(65) Prior Publication Data

US 2012/0221217 A1 Aug. 30, 2012

Related U.S. Application Data

(60) Provisional application No. 61/447,418, filed on Feb. 28, 2011.

(51) Int. Cl.
| | |
|---|---|
| *B60W 10/06* | (2006.01) |
| *B60W 30/188* | (2012.01) |
| *F02D 41/02* | (2006.01) |
| *F02D 41/00* | (2006.01) |
| *F16H 63/42* | (2006.01) |

(52) U.S. Cl.  
CPC ........... *B60W 10/06* (2013.01); *B60W 30/1882* (2013.01); *F02D 41/021* (2013.01); *F02D 41/0225* (2013.01); *F16H 2063/426* (2013.01); *F02D 41/0087* (2013.01); *B60W 2550/14* (2013.01); *F02D 2200/701* (2013.01); *B60Y 2300/435* (2013.01)  
USPC .............................................. 701/54; 701/58

(58) Field of Classification Search  
CPC ..... B60W 10/06; B60W 20/00; B60W 10/08; B60W 2710/0666; B60W 30/18  
USPC ............................................................ 700/54  
See application file for complete search history.

(56) References Cited

U.S. PATENT DOCUMENTS

| | | | |
|---|---|---|---|
| 5,323,318 A | 6/1994 | Hasegawa et al. | |
| 7,314,034 B1 * | 1/2008 | Waters et al. | ............... 123/198 F |
| 7,377,250 B1 | 5/2008 | Duffy | |
| 2002/0189576 A1 * | 12/2002 | Wildner | ................... 123/198 F |

(Continued)

OTHER PUBLICATIONS

How Chrysler's Multiple Displacement System works, Greg Montero, Oct. 12, 2009.*

(Continued)

*Primary Examiner* — Ian Jen  
(74) *Attorney, Agent, or Firm* — Faegre Baker Daniels LLP

(57) ABSTRACT

This disclosure provides a system and method for determining cylinder deactivation in a vehicle engine to optimize fuel consumption while providing the desired or demanded power. In one aspect, data indicative of terrain variation is utilized in determining a vehicle target operating state. An optimal active cylinder distribution and corresponding fueling is determined from a recommendation from a supervisory agent monitoring the operating state of the vehicle of a subset of the total number of cylinders, and a determination as to which number of cylinders provides the optimal fuel consumption. Once the optimal cylinder number is determined, a transmission gear shift recommendation is provided in view of the determined active cylinder distribution and target operating state.

14 Claims, 6 Drawing Sheets

(56) References Cited

U.S. PATENT DOCUMENTS

| | | |
|---|---|---|
| 2008/0125928 A1* | 5/2008 | Conlon et al. .................. 701/22 |
| 2008/0201047 A1 | 8/2008 | Eisele et al. |
| 2008/0262712 A1 | 10/2008 | Duty et al. |
| 2009/0070019 A1* | 3/2009 | Heap .............................. 701/112 |
| 2009/0082170 A1* | 3/2009 | Heap ................................ 477/3 |
| 2009/0118886 A1* | 5/2009 | Tamai et al. .................... 701/22 |
| 2009/0118923 A1* | 5/2009 | Heap et al. ...................... 701/54 |
| 2009/0118963 A1* | 5/2009 | Heap .............................. 701/99 |
| 2010/0147258 A1 | 6/2010 | Edwards et al. |
| 2010/0151988 A1* | 6/2010 | Tabata et al. ..................... 477/3 |
| 2010/0204879 A1 | 8/2010 | Katrak et al. |
| 2010/0318268 A1* | 12/2010 | Jager et al. ..................... 701/54 |
| 2011/0040471 A1 | 2/2011 | Krupadanam et al. |

OTHER PUBLICATIONS

International Search Report and Written Opinion of the International Searching Authority dated Feb. 1, 2013 from corresponding International Application No. PCT/US2012/027038.

* cited by examiner

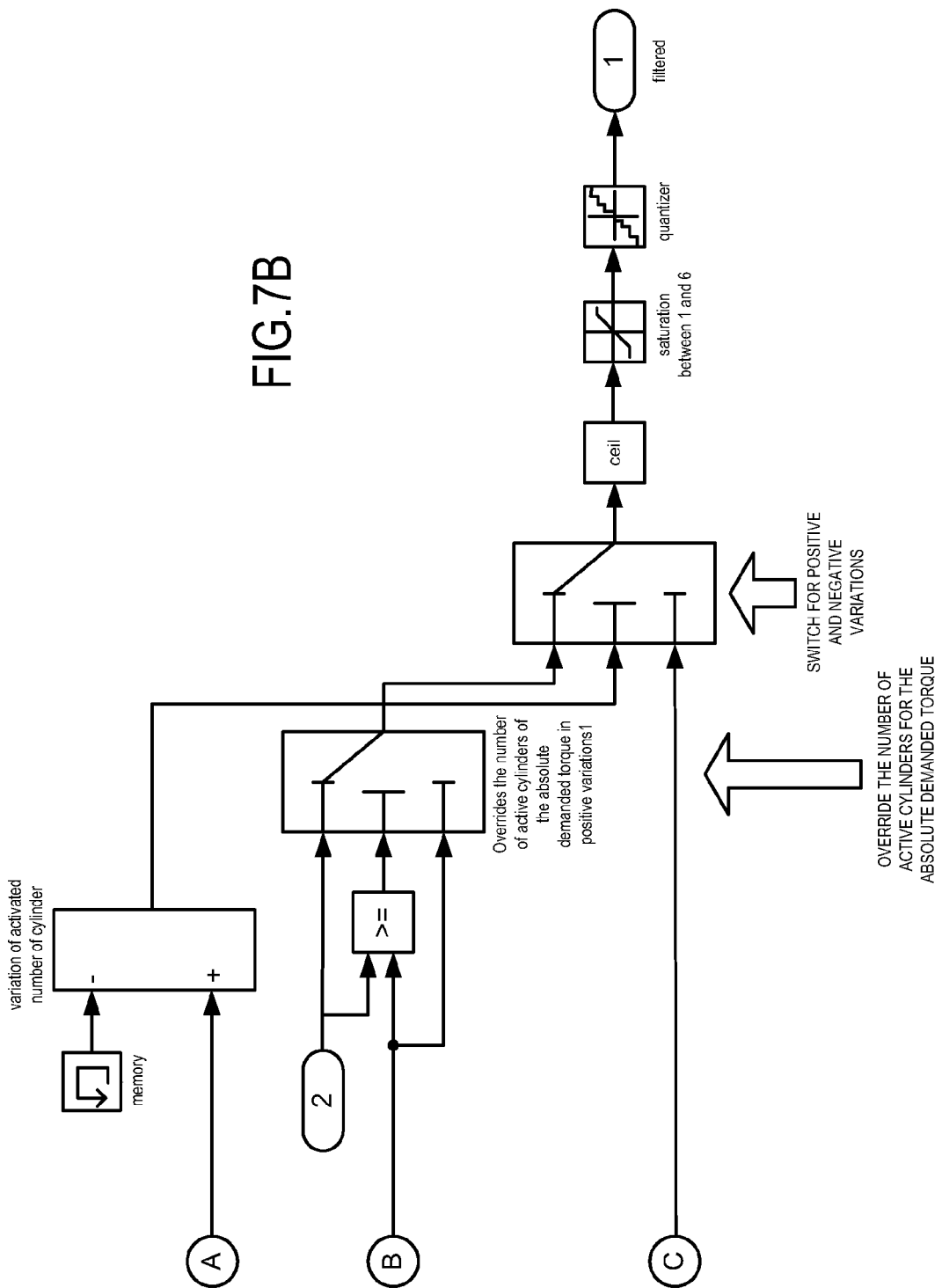

SYSTEM AND METHOD OF CYLINDER DEACTIVATION FOR OPTIMAL ENGINE TORQUE-SPEED MAP OPERATION

CROSS REFERENCE TO RELATED APPLICATIONS

This application claims benefit of priority to Provisional Patent Application No. 61/447,418 filed on Feb. 28, 2011, the entire contents of which are hereby incorporated by reference.

STATEMENT REGARDING FEDERALLY SPONSORED RESEARCH OR DEVELOPMENT

This invention was made with government support under "Recovery Act—System Level Demonstration of Highly Efficient and Clean, Diesel Powered Class 8 Trucks (Supertruck)," Program Award Number DE-EE0003403 awarded by the Department of Energy (DOE). The government has certain rights in the invention.

TECHNICAL FIELD

This disclosure relates to economizing fuel consumption during vehicle travel. More particularly, the present disclosure relates to optimizing vehicle fuel consumption utilizing cylinder deactivation (cutout).

BACKGROUND

Cylinder deactivation in an internal combustion engine is a process by which a subset of the cylinders of the engine are deactivated completely or partially during prescribed operating conditions. These prescribed conditions include operation of the engine under light load conditions in which cylinder deactivation can improve efficiency or under cold conditions in which cylinder deactivation can force more rapid warm up. When a prescribed condition exists, the engine controller can deactivate one or more cylinders by cutting off fuel supply to each of those cylinders during at least one combustion cycle.

SUMMARY

In one aspect, this disclosure provides a method for optimizing fuel consumption in a vehicle when changing from a current operating state to a target operating state. The method includes receiving data indicative of a vehicle current operating state based on at least two of power demand, engine speed, engine torque, gear number, and vehicle speed, receiving data indicative of terrain variation, determining vehicle target operating state including desired torque and the terrain variation data, determining the active cylinder distribution to minimize fuel consumption based on the determined target operating state, and providing a transmission gear shift recommendation in view of the determined active cylinder distribution and target operating state.

In another aspect, this disclosure provides a system adapted to optimize fuel consumption in a vehicle when changing from a current operating state to a target operating state. The system includes a current operating state module including data indicative of a vehicle current operating state based on at least two of power demand, engine speed, engine torque, gear number, and vehicle speed, a terrain variation module including data indicative of terrain variation, a target operating state module containing a vehicle target operating state based on factors including desired torque based on the terrain variation data, an active cylinder module containing a determination of the active cylinder distribution to minimize fuel consumption based on the determined operating state, and a transmission gear recommendation module containing a transmission gear shift recommendation in view of the determined active cylinder distribution and target operating state.

BRIEF DESCRIPTION OF THE DRAWINGS

FIGS. 7A and 7B are diagrams of a selectable hysteresis filter according to an exemplary embodiment.

DETAILED DESCRIPTION

Figure 1:
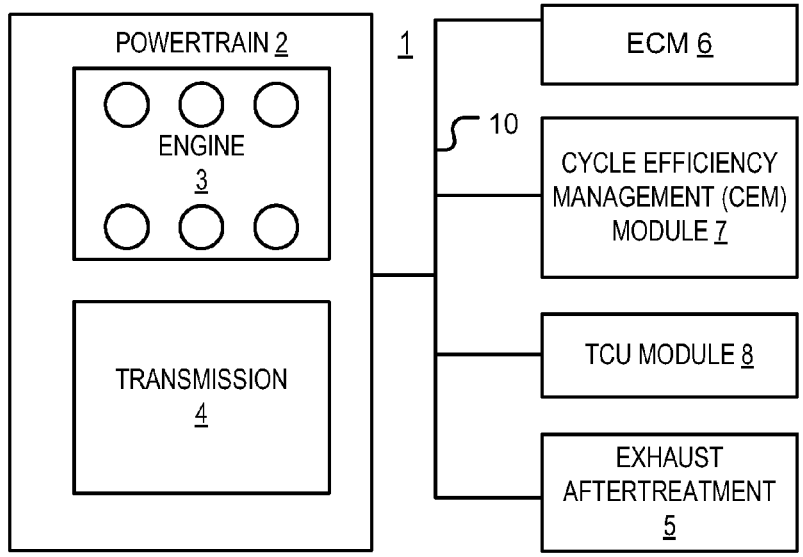
FIG. 1 is a diagram of an internal combustion engine system including a cycle efficiency management (CEM) module according to an exemplary embodiment.

To optimize fuel consumption in transitioning from a current engine/system operating state to a new/desired operating state, applicants introduce a Cycle Efficiency Management (CEM) module. The CEM module employs control processes to furnish an operator with anticipated and currently desired vehicle operational behavior to optimize fuel economy. The CEM module control processes focus on powertrain components such as engine, transmission, accessories, final drive, wheels and vehicle. The processes interface with the operator to provide guidance as to appropriate vehicle speed/power targets and transmission gear selection targets. The CEM module is useful in conditioning an operator to optimize behavior based on certain performance criteria.

In accordance with exemplary embodiments of the systems and methods of the present disclosure, the CEM module determines a recommendation to the engine control module (ECM) and the transmission control unit (TCU) that optimizes (typically minimizes) fuel consumption from the current engine/system operating state to a new/desired operating state. Given a current power demand, engine speed/torque, gear number and vehicle speed, there is also a desired power demand and vehicle speed. For this current vehicle state, there exists a degree of freedom provided by the existence of the transmission gear states that can produce different engine torque/speed solutions to meet the desired power demand. For vehicles possessing a continuously variable transmission (CVT), this solution space is a finite continuum; whereas for vehicles possessing a discrete geared transmission, this solution space is a finite discrete space. Furthermore, the process of traversing an engine map can be typically achieved in a variety of different ways.

Exemplary embodiments of the systems and methods of the present disclosure can project both vehicle load and engine load as a function of terrain while accounting for the degree of freedom provided by the transmission. The degree of freedom can either be discrete, as with traditional discrete geared transmissions, or continuous, as with CVTs. The degree of freedom brought on by the existence of the transmission gear states can produce multiple different engine torque/speed solutions to meet a given power demand. And given the engine load, an optimum cylinder cutout or activation can be identified to minimize the engine BSFC. Exemplary embodiments employ cylinder deactivation to produce a net reduction in fuel consumption under certain conditions so that cylinders that are active are operating closer to their optimum efficiency. For a given engine speed and demand torque, the minimum number of active cylinders is determined such that the least amount of fuel is consumed while providing the desired torque. Exemplary embodiments divide the power requirements evenly across all active cylinders. By exploring the engine, transmission and expected vehicle load space, an optimal pairing of engine state (such as cylinder cutout) and transmission state (gear number) can be identified for a look-ahead window provided by positioning information, for example, from a global positioning system (GPS), terrain data, and route data. The benefit of this solution can be increased freight efficiency in transporting cargo from source to destination. Inputs to the process can also include engine fueling maps and engine braking/friction maps.

FIG. 1 shows a diagram of an engine system 1 according to an exemplary embodiment which can be integrated into a vehicle (not shown), such as a truck or an automobile. Engine system 1 includes a powertrain system 2 including an internal combustion engine 3 having plural cylinders 4, and a transmission 5 of either a CVT or a discrete geared type. Also included in engine system 1 is an ECM 6, a CEM module 7, and a TCU module 8. As will be described later in detail, any one of cylinders 4 or any subset of cylinders 4 can be deactivated by cutting off fuel supply and/or charge air to the deactivated cylinder. The components of engine system 1 communicate with ECM 6 or one another via a network 10, which can be, for example, a controller area network (CAN). Although not shown, the engine system can include a number of additional components, such as an aftertreatment system including components such as a particulate filter (e.g., a DPF), a diesel oxidation catalyst (DOC) and a selective catalytic rejection (SCR) catalyst.

The control processes of CEM module 7 focus on powertrain, such as engine 3, transmission 5, accessories, final drive, wheels, vehicle, and can further include processes directed to controlling aftertreatment components. The processes interface with the operator to provide guidance as to appropriate vehicle speed/power targets and transmission gear selection targets that can be achieved in part by way of operator control of the engine system. CEM module 7 can be useful in conditioning an operator to optimize behavior, and thus fuel economy based on certain performance criteria. In other words, CEM module 7 can perform a supervisory role in connection with vehicle operation and instruct the vehicle operator with recommendations via an operator interface (e.g., displayed and/or audible recommendations).

While not shown in FIG. 1, powertrain 2 also can include an energy conversion device, such as a turbocharger (e.g., a variable geometry turbocharger (VGT)), a high pressure fuel system including fuel injectors for injecting fuel into cylinders of the engine 3, an EGR system etc. Powertrain 2 of FIG. 1 can operate in accordance with a requested, current or projected engine speed command and fuel rate command, hereafter sometimes generally referred to as required speed and torque. These commands are provided to a set of static lookup tables in or accessible by ECM 6 to determine various pre-calibrated operating parameters values corresponding to a current operating point or mode defined by the required speed and torque while maintaining compliance with emissions requirements. ECM 6 provides signals corresponding to the lookup table output to the to the engine system components, such as the air handling system components, an EGR valve, fuel system components to control the engine speed and fueling. The term "pre-calibrated" is used herein to describe a predetermined value derived by experiment and/or calculation and represents a baseline value corresponding to a requested engine speed and fueling requirement.

In an exemplary embodiment, CEM module 7 performs supervisory management of cylinder cutout of the engine system 1. In an exemplary embodiment, CEM module 7 can determine whether operator-controlled changes in engine speed and torque, for example, by down-shifting, no-shifting or up-shifting the transmission from its current gear to a condition favorable for cylinder cutout (deactivation) will yield a more fuel efficient solution. By down-shifting the transmission, the engine can operate at a higher speed while producing the same amount of driveshaft power as with operation at lower speed. Conversely, by up-shifting the transmission, the engine can operate at a lower speed while producing the same amount of driveshaft power as with operation at higher speed. Thus, by generating recommendations for shifting the transmission up or down and/or increasing or decreasing the fueling rate, CEM module 7 can provide instruction for operation of engine system 1 during opportunities where deactivation of one or more cylinders would result in increased operating efficiency.

In another exemplary embodiment, CEM module 7 manages the transmission state, the expected engine/vehicle loading changes, and data obtained from a GPS or other positioning data source, to optimally run an engine closest to its peak brake specific fuel consumption (BSFC).

Use of GPS to predict higher/lower engine load conditions in a look-ahead window, which can be based on time or distance, is activated or employed to identify anticipated vehicle load changes. For example, in an embodiment, the look-ahead window can be activated to provide data related to elevation/speed limit, for example, to project a profile for the look-ahead window. Assuming optimal transmission matching (or given a transmission shifting map), the vehicle load can be translated into an engine load.

For exemplary embodiments not utilizing a GPS signal, optimal cylinder cutout can be determined for the current loading state.

Figure 2:
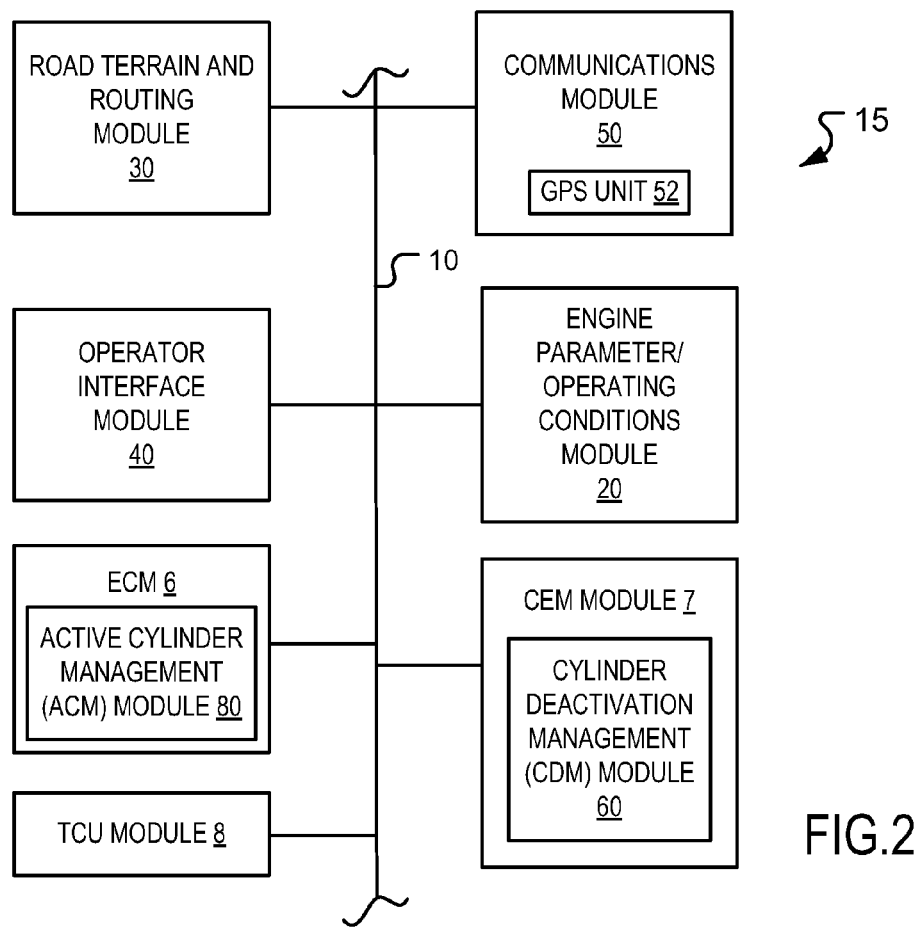
FIG. 2 is a more detailed diagram of an exemplary network system layout including the CEM module shown in FIG. 1.

FIG. 2 shows a diagram of a network system 15 of the monitoring and control system according to an exemplary embodiment. Network system 15 includes the ECM 6, CEM module 7, and the TCU module 8 shown in FIG. 1, and additional modules that communicate with ECM 6, CEM module 7, and/or TCU module 8 via network 10 (e.g., a CAN). Generally, these additional modules can include an engine parameter/operating conditions module 20 that receives predetermined vehicle parameters and current vehicle operating conditions, a road terrain and routing module 30 that receives and/or stores terrain profile data/information and routing information (destination/multi-destination routing), and an operator interface module that receives operator input and provides output to the operator and can communicate with the CEM module 7 via communications module 50 (e.g., a CAN network module) to provide information to a cylinder deactivation management (CDM) module 60 of the CEM module 7, which is described in detail later. CDM module 60 communicates with an active cylinder management (ACM) module 80 of ECM 6 to provide recommended deactivated cylinder operation.

As shown in FIG. 2, communications module 50 can include a GPS unit 52 to receive information to determine coordinate positioning and/or supply data in advance of an operation or forthcoming positions or in real-time as the vehicle is operated and route traversed. Alternative embodiments provide for road terrain data to be maintained in computer storage and downloaded to CEM module 7 prior to the start of a trip or transmitted wirelessly over-the-air at any time, for example, by using cellular technology. The positioning information provided by GPS unit 52 can be used by operator interface module 40 and/or the road terrain and routing module 30 to determine where the vehicle is on a route, the current road conditions, and to predict future road conditions and related engine speed and fueling/torque requirements.

CEM module 6 can receive information from ECM 5, engine parameter/operating conditions module 20, the road terrain module 30, and/or the operator interface module 40 via communications module 50, and then this information can be used by CDM module 60 to determine whether to recommend operating the engine using less than the total number available engine cylinders 4, for example, by recommending to ACM module 80 operating engine 3 using a minimum number of cylinders required to meet a demanded torque. The ACM module 80 is configured to determine whether the recommended minimum number of active cylinders is feasible, and to feed back to the CDM module 60 the feasible number of cylinders it can deactivate. Also, ACM module 80 can be configured to manage which cylinders to deactivate and a manner in which the cylinders are deactivated. The ACM module 80 also can be configured to calculate total fueling, the choice of cylinders to be deactivated and can include logic for cycling deactivated cylinders.

Figure 3:
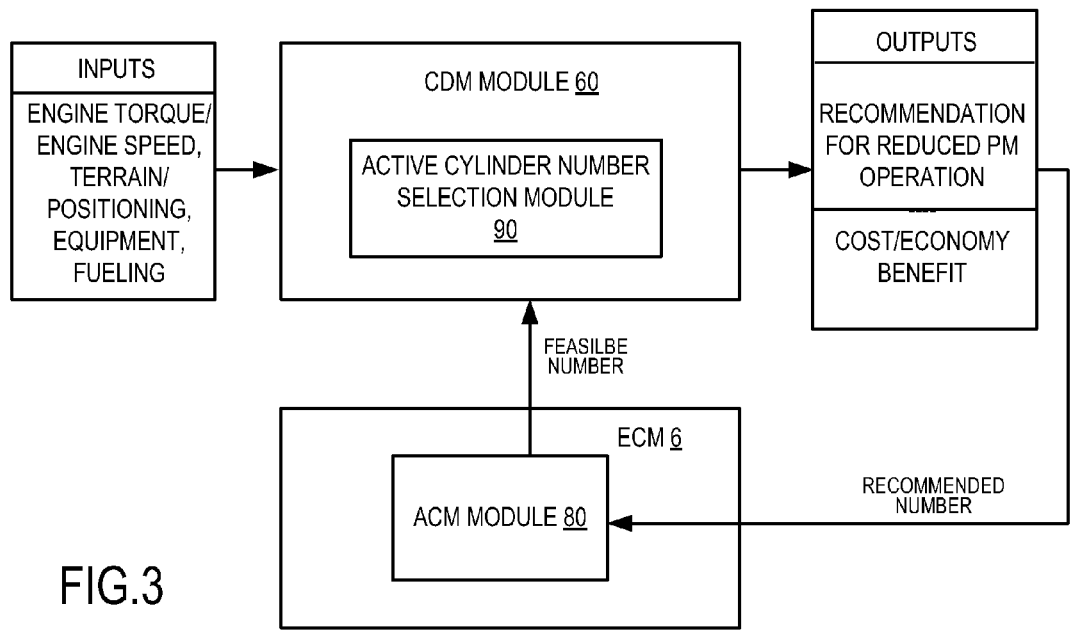
FIG. 3 is a diagram showing details of an exemplary cylinder deactivation management (CDM) module included in the CEM module shown in FIG. 2.
Figure 4:
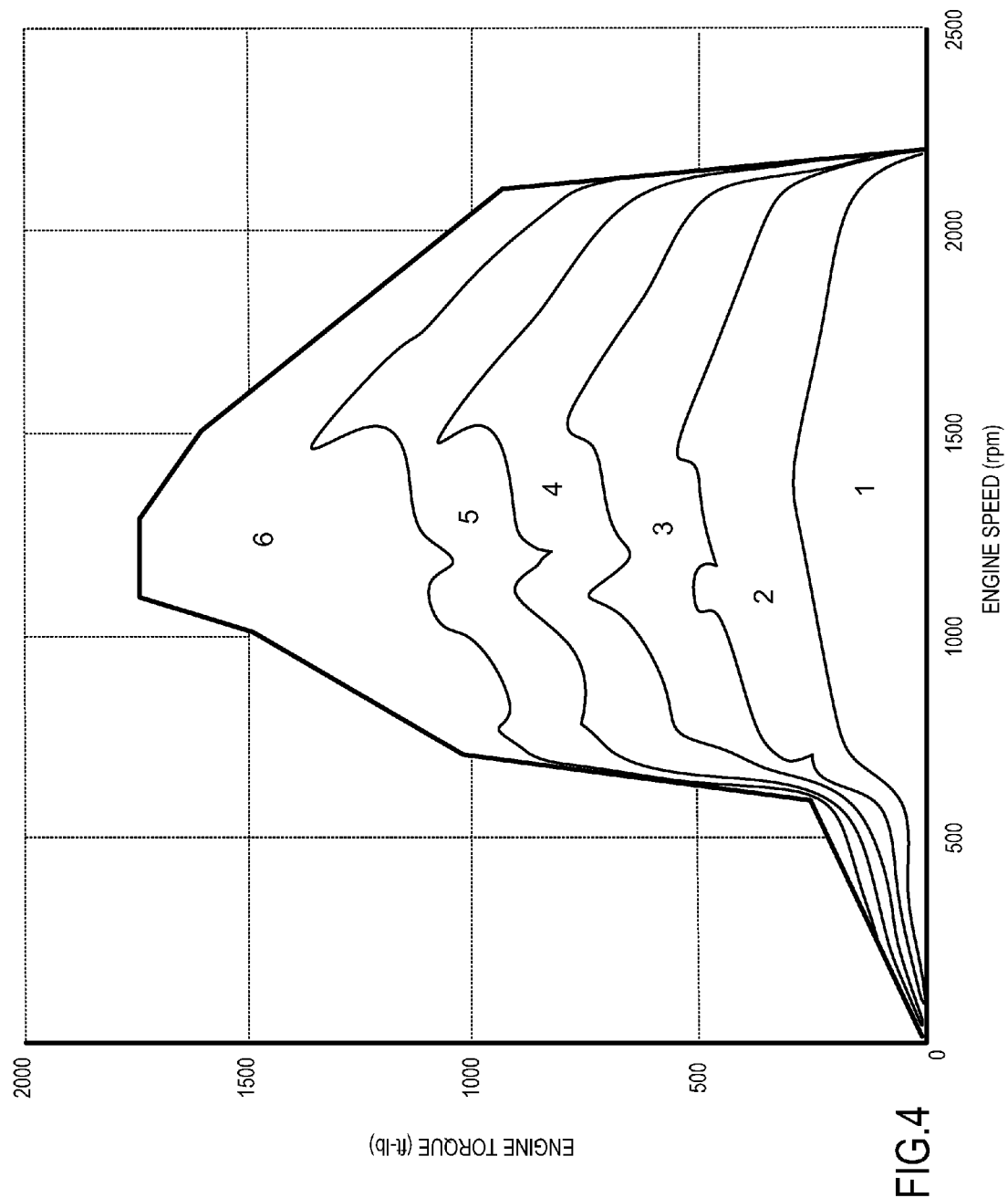
FIG. 4 is an exemplary hot wide open throttle (max torque map) for a six cylinder engine, showing areas of torque-speed available for each cylinder.

FIG. 3 is a diagram showing more details of an exemplary CDM module 60. As shown in FIG. 3, CDM module 60 includes an active cylinder number section module 90, which determines an minimum number of cylinders required to meet demanded torque using an algorithm, which utilizes engine system parameters, such as engine speed, engine torque, vehicle speed, the total number of cylinders in the engine, equipment information such as transmission type and gear ratio. In an embodiment, active cylinder number section module 90 accesses a hot wide open throttle map, such as the map shown in FIG. 4 (max torque map) for a six cylinder engine, to determine a minimum number of cylinders available to achieve the required torque. Thereafter, active cylinder number section module 90 provides the determined minimum number of cylinders that can satisfy the demanded power as a recommendation to ACM module 80.

ACM module 80 thereafter determines whether the recommended cylinder number is feasible, and if not, attempts to determine a feasible value from available options that would result in increased fuel efficiency. In other words, ACM module 80 determines a number of active cylinder from among candidates provided by active cylinder number section module 90 that would result in optimal fueling. For example, for a demanded engine speed and torque, the active cylinder number selection module 90 of the CDM module 60 can select a minimum number of cylinders, m, from the total number of available cylinders, n, m being less than n that would be required to meet the demanded torque, and provide the selected number m to ACM module 80. In a feasibility determination, ACM module 80 checks active cylinder options from m to n and determines which option uses the least amount of fuel while providing the desired torque (e.g., with the torque split evenly across all active cylinders). ACM module 80 feeds back the determined optimal feasible active cylinder number value to CDM module 60 and manages how cylinder deactivation is carried out in engine system 1.

Figure 5:
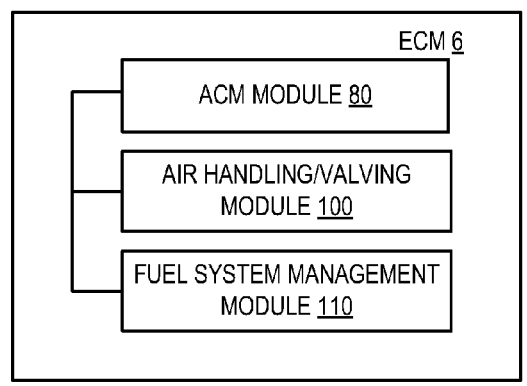
FIG. 5 is a diagram showing plural modules for carrying out cylinder deactivation, which are included in an electronic control module (ECM) according to an exemplary embodiment.

FIG. 5 is a diagram showing an exemplary embodiment of an ECM 6 including ACM module 80, an air handling module 100, and a fuel system management module 110, all of which perform cylinder deactivation based on the determined feasible number of active cylinders. ACM module 80 provides the number of active cylinders required to an air handling/valving system and fuel system for control of the components of the engine system providing cylinder deactivation. In an embodiment, the ACM module 80 can determine which bank of cylinder to be deactivated, and how deactivation is carried out. For example, the ACM module 80 can utilize cylinder deactivation scheduling, for example a round robin rotating schedule, which varies the cylinder numbers that are deactivated and for how long each cylinder is deactivated.

Cylinder deactivation (cutout) can be carried out by cutting out fuel injection into each of the cylinders to be deactivated. For example, the ACM module 80 can direct the fuel system management module 110 to cut fuel injection into each cylinder designated for deactivation. However, the inventors realized that to provide greater brake efficiency, both fuel and charge air are cut from each cylinder to be deactivated. More specifically, brake efficiency, $\eta_{brake}$, is defined as brake power output divided by the fuel energy input:

$$\eta_{brake} = \frac{v_d \cdot N \cdot BMEP}{4\pi \cdot Q_{thv} \cdot rh_f} \quad (1)$$

where BMEP is the brake mean effective pressure. Through the definition of BMEP, the brake efficiency can be rewritten as:

$$BMEP = GIMEP - PMEP - FMEP \quad (2)$$

$$\eta_{brake} = \frac{V_d \cdot N \cdot [GIMEP - PMEP - FMEP]}{4\pi \cdot Q_{thv} \cdot rh_f} \quad (3)$$

where GIMEP is the gross indicated mean effective pressure, PMEP is the pumping mean effective pressure, FMEP is the friction mean effective pressure. Through the definition of gross indicated efficiency, $\eta_{brake}$ can be written as follows:

$$\eta_{GI} = \frac{V_d \cdot N \cdot GIMEP}{4\pi \cdot Q_{thv} \cdot rh_f} \quad (4)$$

$$\eta_{brake} = \eta_{GI} - \frac{V_d \cdot N \cdot [PMEP + FMEP]}{4\pi \cdot Q_{thv} \cdot rh_f} \quad (5)$$

from which is defined the percent power loss due to pumping:

$$\alpha_p = \frac{V_d \cdot N \cdot PMEP}{4\pi \cdot Q_{thv} \cdot rh_f} \quad (6)$$

and the present power loss due to friction:

$$\alpha_f = \frac{V_d \cdot N \cdot FMEP}{4\pi \cdot Q_{lhv} \cdot rh_f} \qquad (6)$$

and equation (5) is now rewritten:

$$\eta_{brake} = \eta_{GI} - \alpha_p - \alpha_f \qquad (7).$$

As can be seen from equation (7), brake efficiency increases for decreasing percent power loss due to pumping, decreasing percent power loss due to friction, and increasing gross indicated efficiency.

To decrease friction and pumping work performed by an inactive cylinder, and thus decrease $\alpha_p$ and $\alpha_f$, ACM module 80 can instruct air handling/valving module 100 to cut supply of air to a deactivated cylinder such that the cylinder volume contains trapped air mass. In an exemplary embodiment, a variable valve actuation system (VVA) can be used to close the intake valve on individual deactivated cylinders during the period that the cylinder is deactivated. Further, the inventors discovered that the timing of valve closure to minimize the trapped air mass provides for less frictional losses. However, the amount of trapped air cannot be minimizing to the point where oil from the crankcase begins to egress into the cylinder as a result of a vacuum from a small mass. In an embodiment, an in-cylinder pressure sensor can be utilized to optimize and monitor the cylinder pressure in the deactivated cylinders. The optimum amount of trapped mass varies based on the number of cylinders deactivated, the torque demand and the engine speed.

Figure 6:
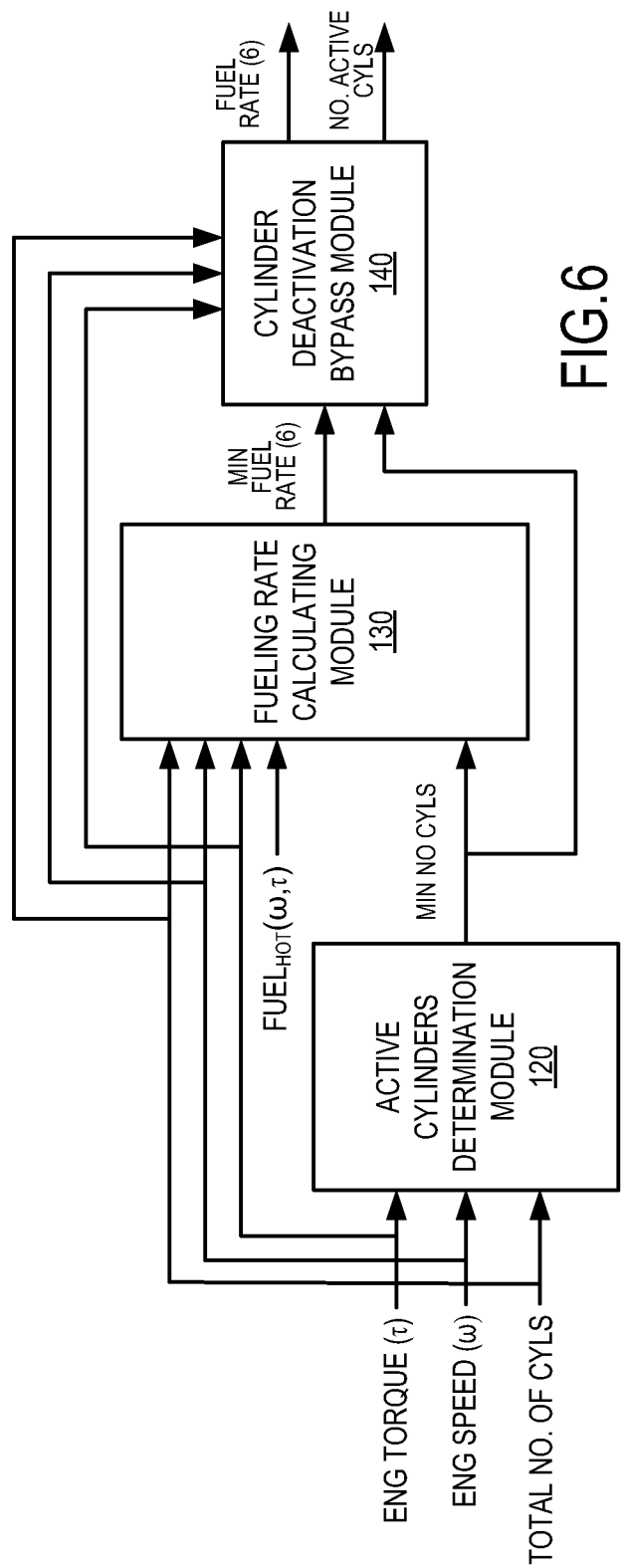
FIG. 6 is a diagram showing exemplary logic modules of a CDM module and an active cylinder management (ACM) module.

FIG. 6 is a diagram of exemplary logic performed by CDM module 60 and ACM module 80 to determine a number of active cylinders and a fueling rate for those active cylinders. Starting from the left hand side of the figure, active cylinder selection module 90 receives as input the required engine speed and engine torque (present, requested or projected engine torque and engine speed), and total number of engine cylinders. This information can be derived from direct measurement, vehicle speed, transmission gear ratio the total number of cylinders in the engine, equipment information such as transmission type and gear ratio. Additionally, vehicle positioning information (e.g., GPS data) and road terrain and routing information can be utilized to provide an expected speed and torque demand in a look-ahead window interval. As explained above, the active cylinder determination module determines a recommended minimum number of cylinders required to satisfy the demanded torque.

As shown in FIG. 6, the recommended minimum number of cylinders (MIN NO CYLS) is received by a fueling rate calculating module 130, which calculates a minimum fueling rate required from each cylinder to achieve the demanded torque. More particularly, fueling for each of the active cylinders is determined based on the received minimum number value, the required engine speed and torque, and fueling map data relating to hot fueling rates per cylinder, and the total number of cylinders in the engine. Fueling rate calculating module 130 investigates fueling required for torque that is required from each cylinder and performs this for combinations of cylinders ranging from the minimum number to the total number of cylinders. If an optimal fueling solution exists, the associated cylinder number value is fed back to the CEM module 7. The fueling to achieve the required torque can be determined by multiplying the required engine torque value by a value corresponding to the total number of cylinders divided by the MIN NO CYLS value (e.g., 6/5 for a six cylinder engine with 5 active cylinders), which yields the amount of torque required for each of the active cylinders. Using this amount and the required engine speed, a fuel rate for that cylinder is determined from the hot fueling map data, and the total fueling can be determined by multiply this rate by the total number of active cylinders. It is to be noted, however, that losses from the inactive cylinders would result in less than torque produced per cylinder. In view of this, the calculation for torque required from each cylinder can be adjusted to account for the losses incurred with each added deactivated cylinder.

The optimal number of active cylinders output from fueling rate calculating module 130 can be bypassed using a cylinder deactivation bypass module 140, which can be switched between active and non-active states, for example, by the operator or remotely using the communications module 50.

The fueling and torque maps or tables can be obtained from, for example, memory of ECM 6, from storage elsewhere in system network 15, or from storage remote from ECM 6. The fueling and torque data can originate from an engine fueling/torque map module(s) (not shown), which can be part of ECM 6 or separate from, but communicably coupled with ECM 6 and other modules of engine system 1.

Additionally, CDM module 60 can calculate the cost economy benefit realizable by the recommended operation and output this information to the operator interface module 40 for display to the operator or communication this information to a remote site. It is to be appreciated that other forms of the cost benefit information can be provided by the CDM module 60, such as cost benefit accumulated over a period of time, histories of operator input and/or adherence to recommendations to the operator interface module 40, the communications module 50. This information can be stored in local memory of the ECM 6, the CEM module 7, or another one of the modules (not shown), in tangible memory separate from the modules or distributed in memory across plural modules (not shown), or in memory remote from the after being transmitted via communication module 40 or downloaded via another process. In an embodiment, this information can be readily accessible by the operator via manipulating an interface such as a menu driven touch screen, voice instruction via microphone, or another interface device.

Exemplary embodiments provide a method for optimizing fuel consumption in a vehicle when changing from a current operating state to a target operating state. The method includes receiving data indicative of vehicle current operating state based on factors including power demand, engine speed and torque, gear number and vehicle speed, and receiving data indicative of terrain variation from a global positioning system (GPS). The method further includes determining vehicle target operating state including desired torque based on said terrain variation data and determining the active cylinder distribution to minimize fuel consumption based on the determined operating state. The method additionally includes providing a transmission gear shift recommendation in view of the determined active cylinder distribution and target operating state.

In an embodiment, a filtering algorithm can be used to minimize frequent variations in the output signal related to the determined optimal number of active cylinders. Also, deactivation can be carried out one cylinder at a time, if possible.

Figure 7A:
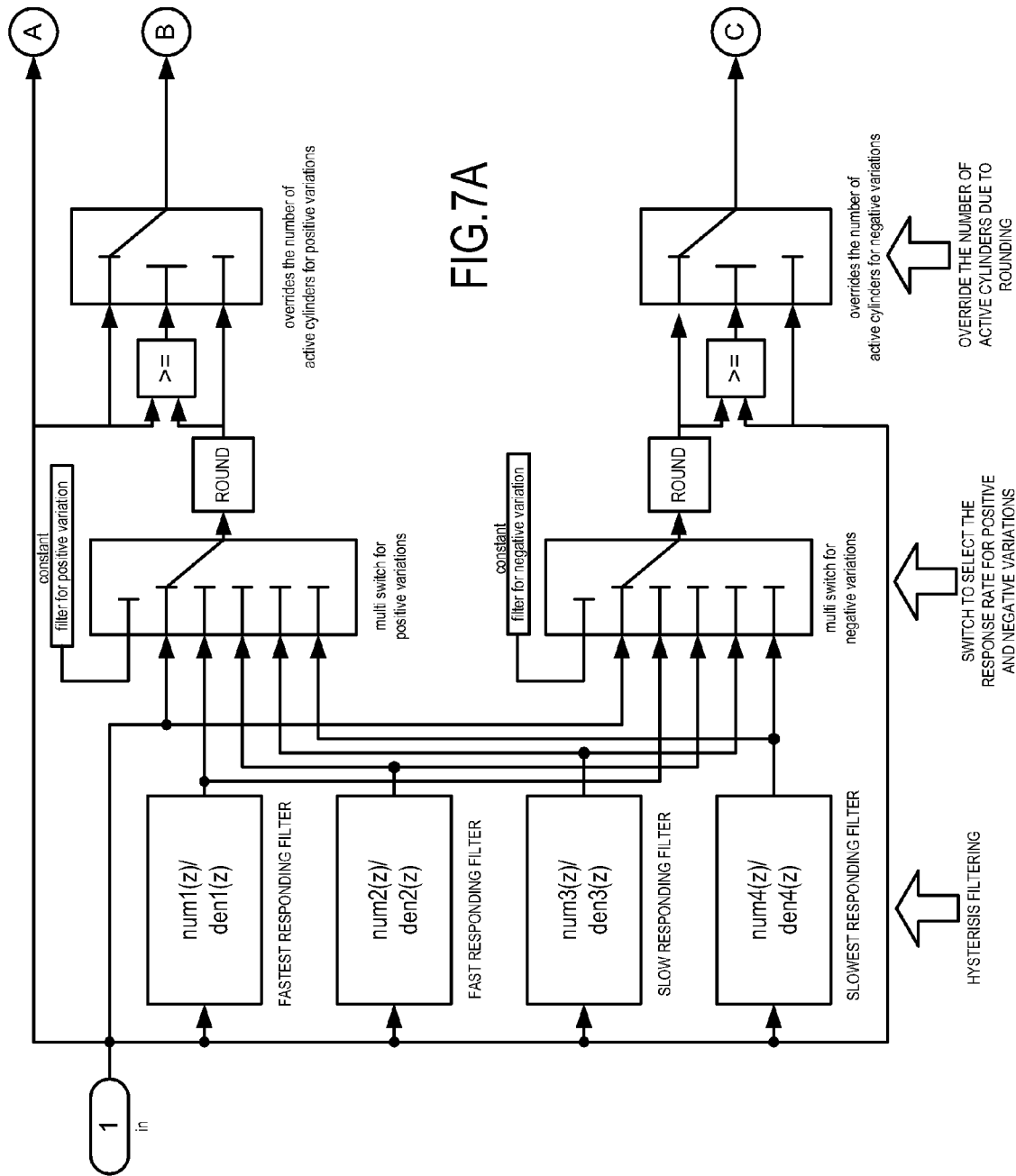

FIGS. 7A and 7B are two-parts of a diagram showing an algorithm utilizing hysteresis filtering, which is implemented using a first-order low pass filter as shown in FIG. 7A. Additionally, response to the number of active cylinders switch between numbers can be adjusted by selecting the different rate—the filter cutoff frequency, and selecting different filters for positive and negative variations. Also, FIG. 7B shows a switch for overriding the number of active cylinders for the absolute demanded torque.

Exemplary embodiments provide a system adapted to optimize fuel consumption in a vehicle when changing from a current operating state to a target operating state. The system comprises a current operating state module including data indicative of vehicle current operating state based on at least two of power demand, engine speed, engine torque, gear number, and vehicle speed. The system further comprises a terrain variation module including data indicative of terrain variation from a GPS, a target operating state module containing a vehicle target operating state based on factors including desired torque based on said terrain variation data, and an active cylinder module containing a determination of the active cylinder distribution to minimize fuel consumption based on the determined operating state. The system additionally comprises a transmission gear recommendation module containing a transmission gear shift recommendation in view of the determined active cylinder distribution and target operating state. CEM module 7 can indicate generated shifting recommendations and other instructions to the operator through operator interface module.

Exemplary embodiments provide a system and method for optimizing fuel consumption in a vehicle when changing from a current operating state to a target operating state to be implemented in computer programmable software and stored in computer readable media. Such an embodiment would comprise a computer readable storage medium encoded with computer executable instructions, which when executed by a processor, perform the method for determining a recommended engine state and transmission gear as disclosed above.

Many aspects of this disclosure are described in terms of logic units or modules that include sequences of actions to be performed by elements of a control module and/or a network system, which can be a computer system or other hardware capable of executing programmed instructions. These elements can be embodied in a controller of an engine system, such as the ECM 6, multiple controllers, or in a controller separate from, and communicating with the ECM 6 or distributed across several modules. In an embodiment, the ECM 6, CEM 7, and other depicted modules can be part of a CAN in which the controller, sensor, actuators communicate via digital CAN messages. It will be recognized that in embodiments consistent with the present disclosure, each of the various actions could be performed by specialized circuits (e.g., discrete logic gates interconnected to perform a specialized function), by program instructions, such as program modules, being executed by one or more processors (e.g., a central processing unit (CPU) or microprocessor), or by a combination of both, all of which can be implemented in a hardware and/or software of the ECM 6 and/or other controller, plural controllers, and/or modules, each of which can utilize a processor or share a processor with another unit (module, controller etc.) to perform actions required. For example, the engine parameter/operating conditions module 20 can be implemented as separate modules for the engine parameters and current operating conditions, and each module can be part of the ECM 6 or as a separately provided module. Logic of embodiments consistent with the disclosure can be implemented with any type of appropriate hardware and/or software, with portions residing in the form of computer readable storage medium with a control algorithm recorded thereon such as the executable logic and instructions disclosed herein, and can be programmed, for example, to include one or more singular or multi-dimensional engine and turbine look-up tables and/or calibration parameters. The computer readable medium comprise tangible forms of media, for example, a random access memory (RAM), a read-only memory (ROM), an erasable programmable read-only memory (e.g., EPROM, EEPROM, or Flash memory), an optical fiber, and a portable compact disc read-only memory (CD-ROM), or any other solid-state, magnetic, and/or optical disk medium capable of storing information. Thus, various aspects can be embodied in many different forms, and all such forms are contemplated to be consistent with this disclosure.

While various embodiments in accordance with the present disclosure have been shown and described, it is understood that the disclosure is not limited thereto. The present disclosure may be changed, modified and further applied by those skilled in the art. Therefore, this disclosure is not limited to the detail shown and described previously, but also includes all such changes and modifications.

What is claimed is:

1. A method for optimizing fuel consumption in a vehicle when changing from a current operating state to a target operating state, the method comprising:
receiving data indicative of a vehicle current operating state based on at least two of power demand, engine speed, engine torque, gear number, and vehicle speed;
receiving terrain variation data;
determining vehicle target operating state including desired torque based on said terrain variation data;
determining an active cylinder distribution to minimize fuel consumption based on said determined vehicle target operating state; and
providing a transmission gear shift recommendation in view of the determined active cylinder distribution and the vehicle target operating state.

2. The method of claim 1, wherein determining said active cylinder distribution comprises receiving a candidate minimum cylinder number corresponding to said determined vehicle target operating state and determining the optimal fueling from among cylinder numbers ranging from the minimum cylinder number to a number of total cylinders in the engine of the vehicle.

3. The method of claim 1, wherein the terrain variation data is based on current vehicle location.

4. The method of claim 1, wherein the terrain variation data is based on upcoming vehicle location.

5. The method of claim 1, further comprising filtering the determined active cylinder distribution using a low pass filter.

6. The method of claim 1, further comprising deactivating cylinders not in the active cylinder distribution one at a time.

7. The method of claim 1, further comprising:
receiving positioning related data; and
determining a position coordinate of a vehicle within said terrain variation.

8. A system adapted to optimize fuel consumption in a vehicle when changing from a current operating state to a target operating state, comprising:
a current operating state module including data indicative of a vehicle current operating state based on at least two of power demand, engine speed, engine torque, gear number, and vehicle speed;
a terrain variation module including data indicative of terrain variation data;
a target operating state module containing a vehicle target operating state based on factors including desired torque based on said terrain variation data;

an active cylinder module containing a determination of an active cylinder distribution to minimize fuel consumption based on said determined vehicle target operating state; and a transmission gear recommendation module containing a transmission gear shift recommendation in view of the determined active cylinder distribution and the vehicle target operating state.

9. The system of claim 8, wherein the target operating state module is configured to determine said active cylinder distribution by receiving a candidate minimum cylinder number corresponding to determined target operating state and determining the optimal fueling from among cylinder numbers ranging from the minimum cylinder number to a number of total cylinders of in the engine of the vehicle.

10. The system of claim 8, wherein the terrain variation data is based on current vehicle location.

11. The system of claim 8, wherein the terrain variation data is based on upcoming vehicle location.

12. The system of claim 8, further comprising a filter configured to low pass filter the determined active.

13. The system of claim 8, wherein said active cylinder module is configured to deactivate cylinders not in the active cylinder distribution one at a time.

14. The system of claim 8, further comprising: a position determining unit configured to receive positioning related data and determining a position coordinate of a vehicle within said terrain variation.

* * * * *